(12) United States Patent
Peters et al.

(10) Patent No.: US 11,818,975 B2
(45) Date of Patent: Nov. 21, 2023

(54) PLANNING AND IMPLEMENTING AGRICULTURAL MEASURES

(71) Applicant: BASF Agro Trademarks GmbH, Ludwighafen am Rhein (DE)

(72) Inventors: Ole Peters, Düsseldorf (DE); Holger Hoffmann, Haan (DE); Gang Zhao, Langenfeld (DE); Subhashree Das, Langenfeld (DE)

(73) Assignee: BASF Agro Trademarks GmbH, Ludwigshafen am Rhein (DE)

( * ) Notice: Subject to any disclaimer, the term of this patent is extended or adjusted under 35 U.S.C. 154(b) by 649 days.

(21) Appl. No.: 16/340,393

(22) PCT Filed: Oct. 11, 2017

(86) PCT No.: PCT/EP2017/075894
§ 371 (c)(1),
(2) Date: Apr. 9, 2019

(87) PCT Pub. No.: WO2018/073060
PCT Pub. Date: Apr. 26, 2018

(65) Prior Publication Data
US 2019/0246549 A1    Aug. 15, 2019

(30) Foreign Application Priority Data
Oct. 18, 2016   (EP) .................................... 16194375

(51) Int. Cl.
*A01B 79/00*   (2006.01)
*A01C 21/00*   (2006.01)
(Continued)

(52) U.S. Cl.
CPC .......... *A01B 79/005* (2013.01); *A01C 21/007* (2013.01); *G05D 1/0219* (2013.01);
(Continued)

(58) Field of Classification Search
None
See application file for complete search history.

(56) References Cited

U.S. PATENT DOCUMENTS

| 4,630,773 | A | 12/1986 | Ortlip |
| 5,220,876 | A | 6/1993 | Monson et al. |

(Continued)

FOREIGN PATENT DOCUMENTS

| DE | 102010034603 A1 | 12/2011 |
| DE | 102011120858 A1 | 6/2013 |

(Continued)

OTHER PUBLICATIONS

U.S. Appl. No. 16/339,418, filed Apr. 4, 2019.
(Continued)

*Primary Examiner* — Adam D Tissot
*Assistant Examiner* — Laura E Linhardt
(74) *Attorney, Agent, or Firm* — Lowenstein Sandler LLP

(57) ABSTRACT

The present invention relates to the planning and implementation of agricultural measures using remote sensing data and local field data.

Figure 1:
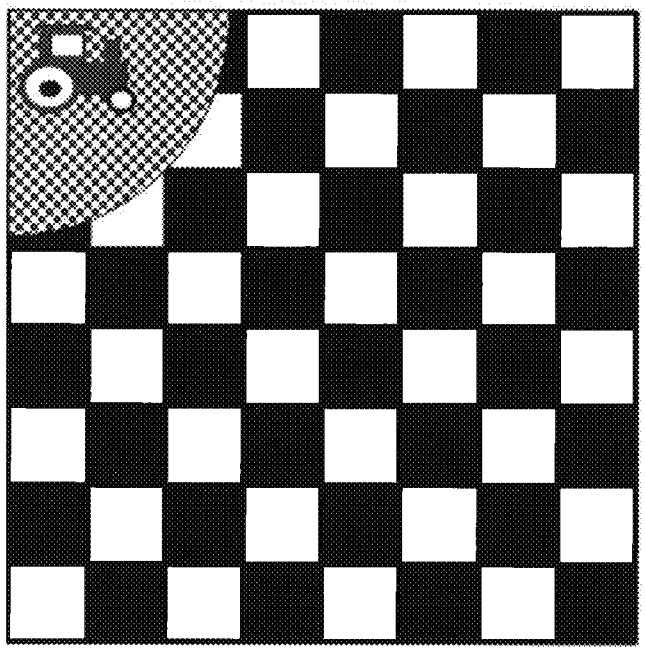

Using remote sensors, the total required amount and partial-area-specific required amounts of plant protection agents and/or nutrients and/or seeds and/or the like can be determined, and based on this information, the use of an application device can be planned. Using local field sensors, the current local required amounts in the field are determined so that the application device can apply the corresponding amounts as required.

15 Claims, 1 Drawing Sheet

(51) Int. Cl.
| | |
|---|---|
| G06Q 50/02 | (2012.01) |
| G05D 1/02 | (2020.01) |
| G01C 21/36 | (2006.01) |
| A01C 14/00 | (2006.01) |
| A01C 23/00 | (2006.01) |
| A01C 7/00 | (2006.01) |

(52) U.S. Cl.
CPC .............. *A01C 7/00* (2013.01); *A01C 21/005* (2013.01); *G05D 1/0278* (2013.01); *G05D 2201/0201* (2013.01)

(56) References Cited

U.S. PATENT DOCUMENTS

| | | | |
|---|---|---|---|
| 9,128,049 | B2 | 9/2015 | Groz et al. |
| 9,959,507 | B2 | 5/2018 | Mathur et al. |
| 2001/0036295 | A1 | 11/2001 | Hendrickson et al. |
| 2003/0130767 | A1 | 7/2003 | Carroll |
| 2003/0187560 | A1 | 10/2003 | Keller et al. |
| 2004/0034450 | A1 | 2/2004 | Seal et al. |
| 2012/0101634 | A1 | 4/2012 | Lindores |
| 2012/0195496 | A1 | 8/2012 | Zaman et al. |
| 2016/0171680 | A1 | 6/2016 | Lobell |
| 2018/0014452 | A1* | 1/2018 | Starr .................. A01G 7/00 |
| 2018/0027725 | A1* | 2/2018 | Koutsorodi ......... A01C 21/005 |
| 2018/0092295 | A1* | 4/2018 | Sugumaran ......... A01C 23/007 |
| 2018/0295771 | A1 | 10/2018 | Peters |
| 2019/0059203 | A1* | 2/2019 | Staples ................. G06Q 50/02 |
| 2019/0174739 | A1 | 6/2019 | Peters et al. |
| 2019/0191617 | A1 | 6/2019 | Hoffmann et al. |
| 2019/0208762 | A1 | 7/2019 | Schafer et al. |

FOREIGN PATENT DOCUMENTS

| | | |
|---|---|---|
| JP | H11-299305 A | 11/1999 |
| WO | WO-9602817 A1 | 2/1996 |
| WO | WO-2015193822 A1 | 12/2015 |

OTHER PUBLICATIONS

U.S. Appl. No. 16/332,833, filed Mar. 13, 2019.
U.S. Appl. No. 16/307,967, filed Dec. 7, 2018.
Aksoy, et al., "Soil mapping approach in GIS using Landsat satellite imagery and DEM data", African Journal of Agricultural Research, vol. 4, Issue 11, Nov. 2009, pp. 1295-1302.
Anatoly A. Gitelson, "Wide Dynamic Range Vegetation Index for Remote Quantification of Biophysical Characteristics of Vegetation", Journal of Plant Physiology, vol. 161, Issue2, 2004, pp. 165-173.
Bannari, et al., "A review of vegetation indices", Remote Sensing Reviews, vol. 13, Issue 1-2, 1995, pp. 95-120.
Crain, et al., "Evaluation of a Reduced Cost Active NDVI Sensor for Crop Nutrient Management", Journal of Sensors, vol. 2012, Jul. 2012, 10 pages.
Hoffmann, et al., "Impact of Spatial Soil and Climate Input Data Aggregation on Regional Yield Simulations", PLoS ONE, vol. 11, Issue 4, 2016, pp. e0151782(1-23).
Johnen, et al., "The proPlant Decision Support System: Phenological Models for the Major Pests of Oilseed Rape and Their Key Parasitoids in Europe", Biocontrol-Based Integrated Management of Oilseed Rape Pests, ed. Ingrid H. Williams, 2010, pp. 381-403.
Moran, et al., "Opportunities and limitations for image-based remote sensing in precision crop management", Remote Sensing of Environment, vol. 61, Issue 3, Sep. 1997, pp. 319-346.
Nawar, et al., "Digital Mapping of Soil Properties Using Multivariate Statistical Analysis and ASTER Data in an Arid Region", Remote Sensing, vol. 7, Issue 2, 2015, pp. 1181-1205.
Newe, et al., "proPlant expert.com—an online consultation system on crop protection in cereals, rape, potatoes and sugarbeet", Bulletin OEPP EPPO Bulletin, vol. 33, Issue 3, Dec. 2003, pp. 443-449.
Quebrajo, et al., "An Approach to Precise Nitrogen Management Using Hand-Held Crop Sensor Measurements and Winter Wheat Yield Mapping in a Mediterranean Environment", Sensors, vol. 15, Issue 3, 2015, pp. 5504-5517.
Scharf, et al., "Remote sensing for nitrogen management", Journal of Soil and Water Conservation, vol. 57, Issue 6, 2002, pp. 518-524.
Sims, et al., "Towards the Operational Use of Satellite Hyperspectral Image Data for Mapping Nutrient Status and Fertilizer Requirements in Australian Plantation Forests", IEEE Journal of Selected Topics in Applied Earth Observations and Remote Sensing, vol. 6, Issue 2, Apr. 2013, pp. 320-328.
Srivastava, et al., "Pest Monitor and Control System Using Wireless Sensor Network (with Special Reference to Acoustic Device Wireless Sensor)", International Conference on Electrical and Electronics Engineering 2013 Goa, Jan. 27, 2013, pp. 40-46.
Vina, et al., "Comparison of different vegetation indices for the remote assessment of green leaf area index of crops", Remote Sensing of Environment, vol. 115, Issue 12, Dec. 15, 2011, pp. 3468-3478.
Wulf, et al., "Remote Sensing of Soils", Remote Sensing Laboratories Department of Geography, University of Zurich, Version 5.2, Jan. 20, 2015, pp. 1-71.
Zhang, et al., "Using satellite multispectral imagery for damage mapping of armyworm (*Spodoptera frugiperda*) in maize at a regional scale", Pest Management Science, vol. 72, issue 2, Feb. 2016, pp. 335-348.
Zhou, et al., "Detecting Anomaly Regions in Satellite Image Time Series Based on Sesaonal Autocorrelation Analysis", ISPRS Annals of the Photogrammetry, Remote Sensing and Spatial Information Sciences, vol. III-3, 2016 XXIII ISPRS Congress, Czech Republic, Jul. 12-19, 2016, pp. 303-310.
International Search Report for PCT/EP2017/075894 dated Nov. 17, 2017.
Written Opinion of the International Searching Authority for PCT/EP2017/075894 dated Nov. 17, 2017.
Kanemasu, et al., "Chapter 12—Estimating grassland biomass using remotely sensed data", Applications of remote sensing in agriculture, 1990, pp. 185-199.

* cited by examiner

PLANNING AND IMPLEMENTING AGRICULTURAL MEASURES

CROSS-REFERENCE TO RELATED APPLICATIONS

This application is a national stage application (under 35 U.S.C. § 371) of PCT/EP2017/075894, filed Oct. 11, 2017, which claims benefit of European Application No. 16194375.8, filed Oct. 18, 2016, both of which are incorporated herein by reference in their entirety.

The present invention relates to the planning and implementation of agricultural measures using remote sensing data and local field data.

The term precision agriculture (precision farming) refers to site-specific and targeted farming of agricultural areas. The goal is to take into account the differences in the soil and productivity within a field.

This will be explained using the example of application of plant protection agents.

Plant protection agents are used throughout the world for protecting plants or plant products from harmful organisms or preventing the action thereof, destroying unwanted plants or plant parts, inhibiting the unwanted growth of plants or preventing such growth, and/or in another manner as nutrients for affecting the physiological processes of plants (e.g. growth regulators).

Plant protection agents may be subject to limitations on use in some countries; for example, some plant protection agents can be used only at specified times, at specified locations, for a specified purpose and/or in a specified amount.

An additional problem in plant protection is the risk of resistance formation by insects, weeds, and fungi to individual active compounds.

Accordingly, plant protection agents should be used only when required and only in the respective amounts necessary.

However, it is difficult to determine the respective requirement for plant protection agents.

The exact dosage of a plant protection agent depends on the biophysical state of the vegetation at the exact time of use of the plant protection agent. In principle, therefore, it would be necessary to determine the requirement immediately before applying a plant protection agent.

In addition, the biophysical state of vegetation is not uniform within a field. Different growth stages can be present that require an adjusted dosage.

Similar considerations apply to the use of nutrients for the cultivated crop plants. The nutrient requirement of the plants can also vary locally. On the one hand, the soil conditions may vary spatially, with some areas having fewer nutrients available than other areas. On the other hand, it may be that the cultivated crop plants are underdeveloped in some areas (e.g. as a result of local weather damage) and it is not worthwhile for economic reasons to further invest in these areas, which is why the use of nutrients in this case is unprofitable.

Differences in the field with respect to e.g. soil or weather conditions should also be taken into consideration in sowing a crop plant in order to achieve a maximum yield. For example, it is conceivable that in some areas of the field, denser planting is more favorable, while planting is to be less dense in other areas. It is also conceivable to select the crop plant or type to be cultivated based on the respective soil properties present.

There is thus a need to be able to recognize inhomogeneities in the field that can have an effect on the subsequent yield and/or that require correspondingly adapted treatment of the field in order to sustainable achieve a maximum yield.

Satellite images can provide information on the biophysical state of a field; using such images, moreover, inhomogeneities in a field can be recognized (cf. for example M. S. Moran et al.: *Opportunities and Limitations for Image-Based Remote Sensing in Precision Crop Management*, Remote Sensing of Environment (1997) 61: 319-346).

However, daily updated information on satellite images is ordinarily not available; on the one hand, satellite images are not taken daily in many areas, and on the other, clouds can for example make the production of usable remote sensing data difficult or even impossible.

Moreover, many satellite images do not provide sufficient spatial resolution to properly detect local inhomogeneities present in the field.

Using local sensors in the field, the current local state of the field can be determined. However, the range of local sensors is limited. In some cases, machines for mechanical cultivation of a field are equipped with sensors that detect the state of the field while the machines move through the field (cf. for example WO 2015193822 or DE 102010034603). In this way, the range of the sensors is increased. The data are thus produced during cultivation and can be directly included in cultivation. However, a drawback is that planning of an agricultural measure for the entire field is not possible based solely on the spontaneously produced data, as only a portion of the field can be covered by the sensors at any time.

An object is therefore to further optimize the partial-area-specific farming of agricultural fields.

This object is achieved by the subject matter of independent claims 1 and 13. Preferred embodiments are found in the dependent claims and in the present description.

A first subject matter of the present invention is thus a method comprising the steps of:
  receiving at least one digital image of a field for crop plants, wherein the at least one digital image has been generated using one or a plurality of remote sensors,
  planning a partial-area-specific agricultural measure in the field based on the digital image of the field and providing means for partial-area-specific implementation of the measure, and
  carrying out the measure, wherein during the implementation of the measure by means of one or a plurality of sensors, one or a plurality of current local parameters is/are recorded over the field, and implementation of the measure is continuously adapted to the current local parameter(s).

A further subject matter of the present invention is a system comprising:
  a first computer system, configured such that
  it receives at least one digital image of a field for crop plants, wherein the at least one digital image has been generated using one or a plurality of remote sensors, and
  it supports a user, based on the digital image of the field, in planning a partial-area-specific agricultural measure in the field, wherein the computer system determines means that must be provided for the partial-area-specific implementation of the measure,
  and a second computer system, configured such that
  it determines the current local state of the field in implementation of the measure by means of one or a plurality of sensors and adapts implementation of the measure to the current local state.

A BRIEF DESCRIPTION OF THE FIGURES

FIG. 1 is a schematic image of a field for crop plants. The large square with the checkerboard pattern represents the field. The checkerboard pattern illustrates the spatial resolution of the image. It is largely determined by the resolution of the remote sensor used.

Figure 2:
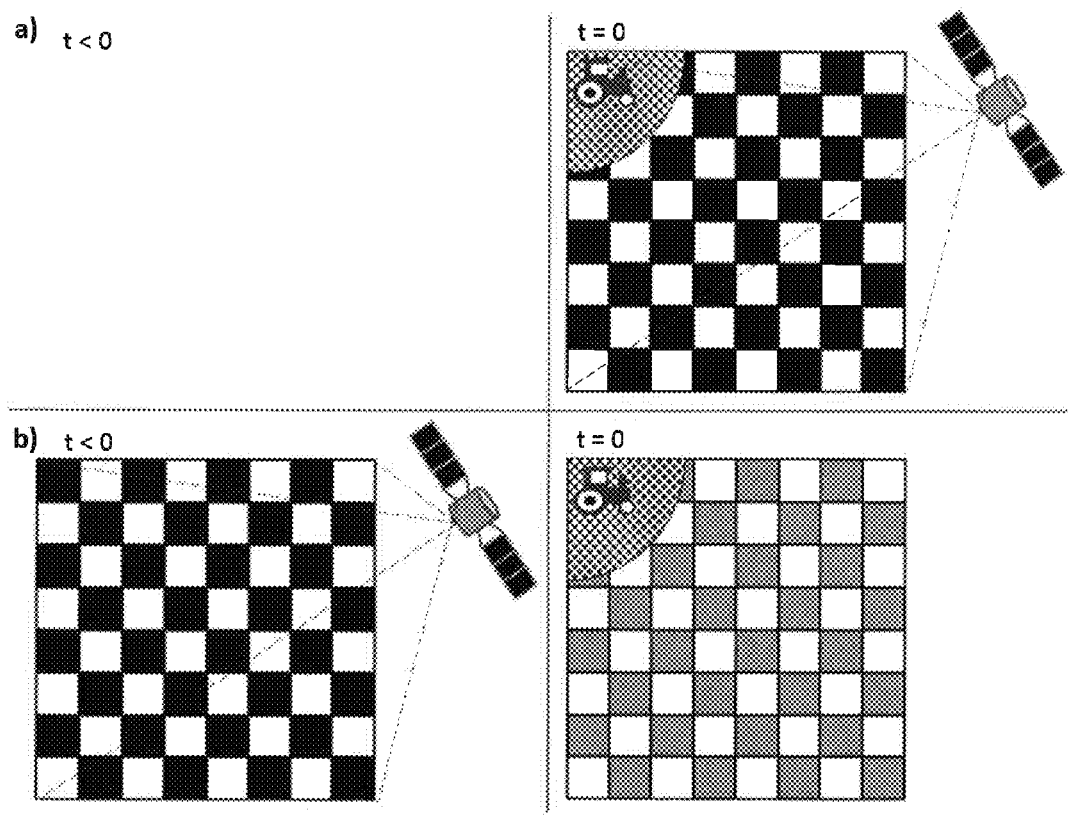

FIG. 2 is a schematic image of field for crop plants at different points in time t=0 and t<0 for two scenarios a) and b).

The invention is described in further detail below without distinguishing among the subject matter of the invention (method, system). Rather, the following explanations apply analogously to all subject matter of the invention, regardless of the context in which they occur (method, system).

In the description of the method according to the invention, if steps are listed in a particular sequence, this does not necessarily mean that the steps have to be carried out in said sequence. Rather, the invention is to be understood such that the steps listed in a particular sequence can be carried out in any desired sequence or parallel to one another, unless a step is based on another step, which should be clearly apparent in each case from the description of the steps. Accordingly, the sequence specifically listed in this document constitutes only a preferred embodiment of the invention.

In a first step of the method according to the invention, at least one digital image of a field for crop plants is received, wherein the at least one digital image has been generated using one or a plurality of remote sensors.

The term "crop plant" is understood to refer to a plant that is cultivated by human intervention in a targeted manner as a useful or ornamental plant.

The term "field" is understood to refer to a spatially delimitable area of the Earth's surface that is agriculturally used in that crop plants are cultivated, provided with nutrients and harvested in such a field. An individual variety of a crop plant can be cultivated in a field; however, different varieties of a crop plant and/or different crop plants can also be cultivated. It is also conceivable that a field comprises an area or a plurality of areas in which no crop plants have been cultivated and/or are cultivated.

The term "image" is understood to refer to a two-dimensional representation of the field or an area of a field.

The term "digital" means that the image of a machine, as a rule a computer system, can be processed. The term "processing" is understood to refer to the known methods of electronic data processing (EDP).

The at least one digital image is produced using one or a plurality of remote sensors. The digital image thus constitutes remote sensing data.

"Remote sensing data" are digital data obtained remotely, for example by satellites, from the Earth's surface. The use of aircraft (unmanned (drones) or manned) to record remote sensing data is also conceivable.

By means of the remote sensors, digital images of areas of the Earth's surface are produced from which information on the vegetation and/or the environmental conditions prevailing in said areas can be obtained (cf. for example M. S. Moran et al.: *Opportunities and Limitations for Image-Based Remote Sensing in Precision Crop Management*, Remote Sensing of Environment (1997) 61: 319-346).

The data from these sensors are obtained via interfaces provided by the vendor and can comprise optical and electromagnetic (e.g. synthetic aperture radar, SAR) data sets of various processing stages.

The digital image can be read into a computer system and displayed on a screen connected to the computer system. A user of the computer system recognizes the recorded field or portions of the recorded field in the image on the screen. The "digital image" is therefore a digital representation of the field.

The at least one digital image is ordinarily received using a computer system connected to a computer network. A digital image of a remote computer system is thus transmitted to a computer system used by a user to implement the present invention (here the so-called first computer system).

The digital image contains information on the field and/or the crop plants cultivated therein that can be used for planning the agricultural measure (cf. for example M. S. Moran et al.: *Opportunities and Limitations for Image-Based Remote Sensing in Precision Crop Management*, Remote Sensing of Environment (1997) 61: 319-346).

For example, the digital image of the field can indicate the vegetation status of the crop plants cultivated in the field at the time when the image was taken.

The vegetation state of the crop plants can be determined from the digital images e.g. by calculating a vegetation index. A known vegetation index is for example the normalized difference vegetation index (NDVI, also known as the normalized density vegetation Index). The NDVI is calculated from the reflectance values in the near infrared region and the red visible region of the light spectrum. The index is based on the fact that healthy vegetation reflects a relatively small amount of radiation in the red region of the visible spectrum (wavelength of approximately 600 to 700 nm) and a relatively large amount of radiation in the adjacent near infrared region (wavelength of approximately 700 to 1300 nm). These differences in reflectance behavior are attributable to different development states of the vegetation. Accordingly, the further the growth of a cultivated crop plant has progressed, the higher the index is.

An NDVI can be calculated for each pixel of a digital image of a field (for example a satellite image of the field). The amount of biomass present can be calculated from the NDVI.

As a further possible vegetation index, the weighted difference vegetation index (WDVI) can be calculated from the remote sensing data (cf. for example US2016/0171680A1).

Furthermore, a leaf area index (LAI) can be prepared from the digital imager (cf. e.g.: A. Viña, A. A. Gitelson, A. L. Nguy-Robertson and Y. Peng (2011): *Comparison of different vegetation indices for the remote assessment of green leaf area index of crops*. In: Remote Sensing of Environment, Vol. 115, pp. 3468-3478, https://msu.edu/~vina/2011_RSE_GLAI.pdf).

A WDVI and/or leaf area index can be calculated for each pixel of a digital image of a field (for example a satellite image of the field).

Further parameters that can be detected from a digital image of a field and provide information on the biophysical state of the field are described for example in the following publications:

M. D. Steven and J. A. Clark (1990): *Applications of Remote Sensing in Agriculture*. University Press, Cambridge/UK, http://www.sciencedirect.com/science/book/9780408047678; A. Bannari, D. Morin, F. Bonn and A. R. Huete (2009): *A review of vegetation indices*. In: Remote Sensing Reviews, Vol. 13, Issue 1-2, pp. 95-120, http://www.tandfonline.com/doi/abs/10.1080/02757259509532298; A. A. Gitelson (2004): *Wide dynamic range vegetation index for remote sensing quantitation of biophysical characteristics of vegetation*. In: Journal of Plant Physiology, Vol. 161, Issue 2, pp. 165-173.

Furthermore, a digital image of a field can indicate infestation of the crop plants cultivated in the field with a harmful organism (cf. for example Jingcheng Zhang et al.: *Using satellite multispectral imagery for damage mapping of army worm (Spodoptera frugiperda) in maize at a regional scale*, Pest Management Science, Volume 72, Issue 2, February 2016, pp. 335-348; Z.-G. Zhou et al.: *Detecting Anomaly Regions In Satellite Image Time Series Based On Seasonal Autocorrelation Analysis*, ISPRS Annals of the Photogrammetry, Remote Sensing and Spatial Information Sciences, Volume III-3, 2016 XXIII ISPRS Congress, 12-19 Jul. 2016, Prague, Czech Republic, pp. 303-310).

Furthermore, a digital image of a field can indicate deficits in the available nutrients (cf. for example Neil C. Sims et al.: *Towards the Operational Use of Satellite Hyperspectral Image Data for Mapping Nutrient Status and Fertilizer Requirements in Australian Plantation Forests*, IEEE Journal of Selected Topics in Applied Earth Observations and Remote Sensing 6(2), April 2013, 320-328; P. C. Scharf: *Remote sensing for nitrogen management*, Journal of Soil and Water Conservation, 2002, Vol. 57, No. 6, 518-524).

Furthermore, a digital image of a field can provide information on properties of the soil (Said Nawar et al.: *Digital Mapping of Soil Properties Using Multivariate Statistical Analysis and ASTER Data in an Arid Region*, Remote Sens. 2015, 7, 1181-1205; doi:10.3390/rs70201181; Ertugrul Aksoy et al.: *Soil mapping approach in GIS using Landsat satellite imagery and DEM data*, African Journal of Agricultural Research Vol. 4 (11), pp. 1295-1302, November, 2009; Hendrik Wulf et al.: *Remote Sensing of Soils*, 22. January 2015, Doc. Ref: 00.0338.PZ/L435-0501, http://www.geo.uzh.ch/fileadmin/files/content/abteilungen/rsl1/Remote_sensing_of_soil s_BAFu_report_dpi300_v.pdf).

In a further step of the method according to the invention, the digital image of the field is used to plan an agricultural measure.

The term "agricultural measure" is understood to refer to any measure in the field for crop plants that is necessary or economically and/or ecologically useful for obtaining a plant product. Examples of agricultural measures are: soil cultivation (e.g. plowing), application of seeds (sowing), watering, removal of weeds/weed grasses, fertilization, control of harmful organisms, and harvesting.

In many agricultural measures, biological and/or chemical agents are applied using an application device. Examples of these agents are plant protection agents and nutrients.

The term "plant protection agents" is understood to refer to an agent that is used for protecting plants or plant products from harmful organisms or preventing the action thereof, destroying unwanted plants or plant parts, inhibiting the unwanted growth of plants or preventing such growth, and/or in another manner as nutrients for affecting the physiological processes of plants (e.g. growth regulators).

Examples of plant protection agents are herbicides, fungicides and pesticides (such as insecticides).

A plant protection agent ordinarily contains an active compound or a plurality of active compounds. The term "active compounds" refers to substances that have a specific action and induce a specific reaction in an organism. Ordinarily, a plant protection agent contains a carrier substance for diluting the one or plurality of active compounds. In addition, additives such as preservatives, buffers, dyes and the like are conceivable. A plant protection agent can be in solid, liquid, or gaseous form.

Growth regulators are used for example for increasing the stability of grain by shortening the stem length (stem shorteners, or more precisely internode shorteners), improving the rooting of cuttings, reducing plant height by compression in horticulture or preventing the germination of potatoes. They are ordinarily phytohormones or synthetic analogs thereof.

The term "nutrients" refers to those inorganic and organic compounds from which the plants can extract the nutrients from which their bodies are constructed. These elements themselves are often referred to as nutrients. Depending on the location of the plant, the nutrients are taken from the air, water, and soil. These are usually simple inorganic compounds such as water ($H_2O$) and carbon dioxide ($CO_2$) and ions such as nitrate ($NO_3^-$), phosphate ($PO_4^{3-}$) and potassium ($K^+$). The availability of these nutrients varies. It depends on the chemical behavior of the nutrient and the site conditions. As the nutrient elements are required in specified proportions, the availability of an element ordinarily limits the growth of the plants. If one adds this element, growth increases. In addition to the core elements of organic matter (C, O, H, N and P), K, S, Ca, Mg, Mo, Cu, Zn, Fe, B, Mn, and Cl, and in higher plants, Co and Ni are of vital importance. Nitrogen can be added for example in the form of a nitrate, ammonia or amino acids. In some cases, $Na^+$ can be used as a functional substitute for $K^+$.

An "application device" is understood to refer to a mechanical device for applying one or a plurality of plant protection agents and/or nutrients to a field. As a rule, such an application device comprises at least one container for accommodating at least one plant protection agent and/or nutrient, a spraying device by means of which the plant protection agent and/or nutrient can be dispensed on the field and a control device used to control the feeding of the at least one plant protection agent and/or nutrient from its container in the direction of the spraying device. Moreover, the application device comprises means for moving in and/or over the field. Preferably, the application device is equipped with a GPS sensor or a comparable sensor so that the respective position of the application device during movement in and/or over the field can be determined.

Planning of the agricultural measure is carried out in a partial-area-specific manner. This means that rather than specifying a uniform measure for the field, local differences in the field are taken into account in that a specific appropriate implementation of the measure is planned for the individual partial areas respectively.

For example, it is conceivable that plants are cultivated in the field that have differing requirements for one or a plurality of plant protection agents and/or nutrients. A partial-area-specific measure takes these differing requirements into account. In such a case, it is planned to treat the field with one or a plurality of plant protection agents and/or nutrients, wherein the amounts of the plant protection agents and/or nutrients to be used are adapted to the differing needs of the crop plants in different areas of the field.

A step in planning a partial-area-specific application of one or a plurality of plant protection agents is ordinarily the determination of a requirement.

For example, it is conceivable that there is a requirement for supplying the plants with one or a plurality of nutrients.

Furthermore, it is conceivable that there is a requirement for application of one or a plurality of plant protection agents.

It is further conceivable that the time for sowing one or a plurality of crop plants is favorable, and there is therefore a requirement for sowing the one or a plurality of crop plants.

Furthermore, it is conceivable that there is a requirement for watering of the field.

Furthermore, it is conceivable that there is a requirement for mechanical cultivation of the soil.

The detected requirement ordinarily has a cause, so that determination of a requirement in the context of this invention can be synonymous with determination of the cause of a requirement.

The requirement for treating a field and/or crop plants with one or a plurality of plant protection agents can for example arise because a pest infestation has occurred or is imminent. For example, it is conceivable that before applying the seed of a crop plant, the weeds and/or weed grasses in the field must be removed. It is also conceivable that after sowing, weeds and/or weed grasses have developed in the field that must be removed. It is also conceivable that a portion of the cultivated crop plants or all of the crop plants is/are infested with a pathogen or a fungus. It is also conceivable that an animal pest has proliferated in the field. It is also conceivable that the spread of a pest infestation is imminent.

The term "harmful organism" is understood to refer to an organism that appears in cultivation of crop plants and can damage the crop plant, negatively affect the harvest of the crop plant or compete with the crop plant for natural resources. Examples of such harmful organisms are weeds, weed grasses, animal pests such as e.g. beetles, caterpillars and worms, fungi and pathogens (e.g. bacteria and viruses). Although viruses are not considered to be organisms from a biological standpoint, they are to be included in the present case under the term harmful organism.

The term "weed" (plural: weeds) is understood to refer to plants belonging to the spontaneous accompanying vegetation of crop plants, grassland or gardens that are not intentionally cultivated in such areas and develop for example from the seed potential of the soil or due to an airborne influx. The term is not restricted to herbs in the strict sense, but also comprises grasses, ferns, mosses or woody plants.

In the area of plant protection, the term "weed grass" (plural: weed grasses) is also frequently used in order to make a clearer distinction from the herbaceous plants. In the present text, the term weed is used as a generic term that includes weed grass, unless specific weeds or weed grasses are referred to.

Accordingly, weed grasses and weeds within the meaning of the present invention are plants that occur in cultivation accompanying a desired crop plant. As they compete with the crop plant for resources, they are undesirable and should therefore be controlled.

Determination of a requirement is preferably carried out using sensors in and/or over the field that register the presence of a harmful organism in the field and/or register the presence of environmental conditions conducive to the spread of a harmful organism.

The use of traps that are set up at various locations in the field can also make an infestation with harmful organisms detectable.

It is also conceivable to use for determination a requirement prediction model, e.g. for predicting pest infestations. Such prediction models have been extensively described in the prior art and are also commercially available. The decision support system proPlant Expert uses for prediction purposes data on the cultivated crop plant (development stage, growth conditions, plant protection measures), the weather (temperature, sunshine duration, wind speed, precipitation) and known pests/diseases (economic limit values, pest/disease pressure) and calculates an infection risk based on these data (Newe M., Meier H., Johnen A., Volk T.: *proPlant expert.com—An online consultation system on crop protection in cereals, rape, potatoes and sugar beet*. EPPO Bulletin 2003, 33, 443-449; Johnen A., Williams I. H., Nilsson C., Klukowski Z., Luik A., Ulber B.: *The proPlant Decision Support System: Phenological Models for the Major Pests of Oilseed Rape and Their Key Parasitoids in Europe*, Biocontrol-Based Integrated Management of Oilseed Rape Pests (2010) Ed.: Ingrid H. Williams. Tartu 51014, Estonia. ISBN 978-90-481-3982-8. pp. 381-403; www.proPlantexpert.com).

The infestation of an adjacent field by a harmful organism, which is reported for example by a farmer, can also indicate a requirement.

Analogously, the requirement of the cultivated crop plants for nutrients can be determined for example by means of local sensors and/or remote sensors and/or inspection and/or prediction models (such as plant growth models).

Analogously, the requirement for application of seeds of the crop plant to be cultivated can be determined for example by means of local sensors and/or remote sensors and/or inspection and/or prediction models (such as plant growth models/weather forecasts).

In an embodiment, the requirement for an agricultural measure is derived from the digital image received in a first step.

In an embodiment, the requirement for an agricultural measure is based on a prediction model.

In an embodiment, the requirement for an agricultural measure is registered by means of one or a plurality of sensors in and/or over the field.

It is also conceivable that a user determines that an agricultural measure is to be carried out. In such an embodiment, the requirement for an agricultural measure is determined by a user.

A further step for planning the partial-area-specific agricultural measure can be the selection of the agents that meet the determined requirement.

For example, if a requirement for application of a nutrient has been detected, a product could be selected that comprises the nutrient.

For example, if a requirement for application of a herbicide for the control of weeds and/or weed grasses has been detected, a product could be selected that controls the weeds and/or weed grasses.

For example, if a requirement for application of an insecticide has been detected, a product could be selected that controls the causal insects.

For example, if a requirement for application of a fungicide has been detected, a product could be selected that controls the causal fungal infestation.

The term "control" is understood to refer to prevention of the infestation of a field or a portion thereof with one or a plurality of harmful organisms and/or prevention of the spread of one or a plurality of harmful organisms and/or reduction in the amount of harmful organisms present.

A further step for planning the partial-area-specific agricultural measure can be determination of the required amount of seeds, plant protection agents, nutrients and/or water to meet the requirement (required amount).

Determination of the amount is preferably carried out in a partial-area-specific manner. This means that the respective required amount is determined for individual partial areas of the field.

The required amount is preferably determined based on the at least one digital image.

The required amount can for example depend on the amount of biomass present. This can for example be the case in the control of weeds and/or weed grasses: the greater the amount of weeds/weed grasses present, the more herbicide must be used for control purposes.

The required amount in supplying the plants with nutrients can also depend on the amount of biomass present: the further a plant has progressed in its development, the greater the requirement for supplying nutrients may be.

However, the required amount can also depend on the size of the leaf area. This can for example be the case in prophylactic treatment of the crop plant with a plant protection agent if there is a risk of infestation with a pathogen or fungus that primarily infests the leaves.

However, the required amount can also depend on the amount of plants infested by a harmful organism.

However, the required amount can also depend on the area in the field in which infestation with a harmful organism is imminent.

In order to determine the partial-area-specific required amount, the respective required amount is preferably determined for each pixel of the digital image.

It is also conceivable to combine adjacent pixels of the digital image (clustering) and to determine the partial-area-specific required amount for the cluster from combined pixels.

A further step for planning the partial-area-specific agricultural measure can be the determination of further means for meeting the requirement. For example, further means can be one or a plurality of application devices, working machines, personnel and the like.

A further step for planning the partial-area-specific agricultural measure can be the determination and/or establishment of a suitable time period for implementation of the measure. For example, crop plants are not harvested when wet, as this would lead for example to the risk of mold formation, which could damage the crop. It would therefore be advantageous to select a period for the harvest before which it has not rained for a few days and during which it will not rain. Weather forecasts can be used to select suitable days.

A further step for planning the partial-area-specific agricultural measure can be the determination and/or establishment of a suitable and/or optimum route for the respective working machine (e.g. an application machine) for implementing the measure.

Further information can be obtained from the at least one digital image that can be used for planning the agricultural measure.

For example, the amount required by the entire field (total required amount) of plant protection agents, nutrients, water and/or seeds can be determined. The total required amount can be determined for example by adding the partial-area-specific required amounts of all partial areas. Knowledge of the total required amount is important, as the corresponding amount must be provided. Moreover, if the total required amount is known, the costs of implementing the agricultural measure can be estimated, and said costs may be largely determined by the costs of the agents to be provided.

Moreover, a range of variation of the partial-area-specific required amounts can be determined from the at least one digital image. Ordinarily, different partial areas show differences in the respective required amounts. The range of variation indicates how large the differences are. There is ordinarily a partial area for which the required amount per unit area is largest, and a partial areas for which the required amount per unit area is smallest. The difference between the maximum and minimum required amount per unit area constitutes the range of variation.

In the following, a few further examples will be given as to how information from the at least one digital image of the field can be used for the planning of an agricultural measure.

For example, it is conceivable that the digital image shows that an area of the field is infested with a harmful organism, while other areas are not (yet) affected. In such a case, rapid intervention may be necessary in order to prevent further spreading of the harmful organism. Accordingly, the planning can be such that the infested area is treated with a pest control agent as rapidly as possible. Areas immediately adjacent to the infested area are preferably also included in the treatment, while unaffected areas far away do not have to be treated.

It is also conceivable for there to be areas with crop plants in the field that lag far behind in development compared to other areas. In such a case, it may be that the areas lagging far behind are not further followed for economic reasons, i.e. are not to be treated with a plant protection agent and/or nutrients because the expense is not justified because of the low expected yield.

For example, the digital image can further be used to determine the route of the at least one application device through and/or over the field. If areas have been identified in which there is no requirement for treatment with a plant protection agent and/or a nutrient, the application device does not need to be driven/flown over these areas.

Moreover, it can be necessary to refill the container of the at least one application device one or multiple times during use with plant protection agents and/or nutrients. Using the partial-area-specific required amounts, one can calculate the amounts of plant protection agents and/or nutrients used on a route or partial route, and the optimum route by which the application device travels the shortest path required to drive/fly to all required positions in the field while refilling plant protection agents and/or nutrients can be determined.

However, the digital image can also be used to determine an optimum route for treatment with plant protection agents in which the risk of contamination is minimal. For example, it is conceivable that nests of pests (e.g. fungi or pathogens) may occur in a field, while other areas are not (yet) affected. In order to avoid inadvertently carrying the pests during movement of the application device through the field from the nests to other as yet unaffected areas, an optimum route can be determined on the digital image such that the nests are driven over at the end and the application device takes the shortest path on its way from the nests out of the field.

However, the digital image can also be used to produce an application map, which is then updated and/or refined using local data in the field, for example during the application process.

An application map is a representation of the field or a portion of the field in which application of one or a plurality of plant protection agents and/or nutrients is to be carried out. The application map indicates on which partial areas of the field and in what amounts one or a plurality of selected plant protection agents and/or nutrients are to be applied, for example in order to prevent the spread of harmful organisms and/or control harmful organisms and/or to ensure that the crop plants are given an optimum supply of nutrients. It is preferably a digital application map that can be read into a control unit of the application device. If the application device moves in and/or over the field, the position of the application device can be determined by means of a GPS sensor or a comparable sensor. By comparing the actual position with the corresponding position on the digital application map, the respective amount of one or a plurality of plant protection agents and/or nutrients required at the actual position can be determined.

In a further step of the method according to the invention, the planned agricultural measure is carried out. During implementation of the measure, one or a plurality of sensors (field sensor(s)) is/are used that detect one or a plurality of local parameters in the field. The detected local parameters are then included in implementation of the agricultural measure so that the implementation is adapted to the local requirements in the field.

By means of the at least one field sensor, at least one parameter is determined locally in the field that is to be taken into account for implementation of the agricultural measure in order to ensure appropriate treatment.

The term "local" is understood to mean that the corresponding sensor covers an area in the environment of an apparatus for implementing the agricultural measure (e.g. an application device) that preferably measures 1 $cm^2$ to 1000 $m^2$, and even more preferably 10 $cm^2$ to 100 $m^2$. The term "environment" is understood to refer preferably to the area that is in front of the apparatus for implementing the agricultural measure in the direction of movement of the apparatus and is covered by the sensor. Accordingly, the apparatus moves toward the "environment" in order to carry out one or a plurality of agricultural measures there. The detection area depends on the type of sensor used and can be determined from the product specifications published by the manufacturer.

For example, if the agricultural measure comprises the application of a plant protection agent, and if it is necessary for economic and/or ecological reasons and/or based on legal regulations and/or based on more efficient and/or more effective use of the plant protection agent e.g. to adapt the amount of the plant protection agent applied to the leaf area or the amount of biomass present or the amount of biomass of a specified species and/or variety present, the at least one parameter is preferably a parameter that provides information on the leaf area or the amount of biomass present or the amount of biomass of the specified species and/or variety present.

For example, if the agricultural measure comprises the application of a plant protection agent for controlling a harmful organism and said application is to be carried out only at, locations where the harmful organism is detectable, the at least one parameter should provide information on the presence of the harmful organism.

If the agricultural measure comprises application of a nutrient or harvesting of the crop plants, and if for economic reasons, the nutrient is to be applied or the harvest carried out only at locations where the cultivated crop plants have exceeded a growth threshold, the at least one parameter should provide information on the locations of the field at which the growth threshold has been reached or even exceeded and the locations at which it has not been reached.

Field sensors for determining local parameters in the field are commercially available in a variety of forms (cf. for example https://www.decagon.com/en/canopy/canopy-measurements/spectral-reflectance sensor-srs/; http://plantstress.com/methods/Greenseeker.pdf; http://dx.doi.org/10.1155/2012/582028; N. Srivastava et al.: *Pest Monitor and Control System Using Wireless Sensor Network (with Special Reference to Acoustic Device Wireless Sensor)*; International Conference on Electrical and Electronics Engineering, 27 Jan. 2013, Goa, ISBN: 978-93-82208-58-7, pp. 40-46; Lucia Quebrajo et al.: An Approach to Precise Nitrogen Management Using Hand-Held Crop Sensor Measurements and Winter Wheat Yield Mapping in a Mediterranean Environment, Sensor 2015, 15, 5504-5517, doi: 10.3390/s150305504).

The at least one parameter that is detected by the at least one field sensor can be the same parameter used for planning the agricultural measure based on the digital image.

However, it is also conceivable that for determining the local requirements in the field by means of the at least one field sensor, a different parameter is used from that used for planning the agricultural measure based on the digital image of the field. Examples of combinations of parameters are given further below.

In an embodiment of the present invention, the at least one field sensor moves together with the at least one application device through the field and/or over the field.

In an alternative embodiment, the at least one field sensor moves independently from the at least one application device through the field and/or over the field. For example, the use of a drone that determines the current local required amounts in the field prior to use of the at least one application device is conceivable.

In a further embodiment of the present invention, a plurality of field sensors is distributed in stationary fashion in and/or over the field.

Mixed forms of the aforementioned embodiments are conceivable.

The at least one field sensor is connected by a communication link to a computer system, by means of which the current local requirement can be determined based on the signals emitted by the field sensor (the so-called second computer system).

This second computer system can be configured such that it controls the at least one application device that moves in and/or over the field so that the respectively determined current local required amounts are applied correspondingly.

However, it is also conceivable that the second computer system is configured such that based on the determined local required amounts, it produces a digital application map that can be read into the working memory of the application device so that the application device applies the respective local required amounts when it is located at the corresponding position in and/or over the field.

However, it is also conceivable that based on the partial-area-specific required amounts determined from the remote sensing data, a first application map has been produced that is updated and/or refined by means of the second computer system using the determined local required amounts.

As described above, a partial-area-specific application map can be produced from the remote sensing data which, because of its partial area specificity, takes into account local requirements in a certain manner. However, the application map generated from the remote sensing data is imprecise and/or not up to date because of the relatively low resolution of the remote sensing data. According to the invention, this deficiency is overcome by using one or a plurality of sensors in and/or over the field (field sensors), for example in order to determine the current local required amount of one or a plurality of plant protection agents and/or nutrients. Therefore, while the digital image produced remotely by means of one or a plurality of remote sensors can for example provide a total required amount, a variability in this required amount, and approximate local required amounts for a field, the actual current local required amounts are determined by the at least one field sensor.

Ordinarily, the at least one field sensor moves together with the application device in and/or over the field. It therefore covers only the immediate environment of the application device, so that using this sensor, for example, the total required amount can only be determined, if at all, when the application device has driven/flown over the entire field and the field sensor has gradually covered the entire field. In this manner, the at least one remote sensor and the at least one field sensor complement each other in an ideal manner: the remote sensor serves to provide an overview of the conditions in the entire field, wherein the overview is used for planning the use of an application device, while the field sensor determines the current local required amount.

Advantageously, the at least one digital image is produced at a time that is near to the time for which the agricultural measure is planned. The closer together the time of the image and the time of the agricultural measure, the more precise the planning. Preferably, the time of the image and the time of the agricultural measure are separated by not more than one month, particularly preferably not more than one week, and most preferably not more than five days.

If the time of the image and the time of the agricultural measure are so far apart that useful planning is not longer possible, e.g. because the conditions in the field have changed so much in the interim that the planned agents and amounts are no longer sufficient to meet the requirements, prediction models can be used to calculate the current state. In such a case, an earlier digital image is received and a prediction model is added, which then preferably calculates the conditions in the field for the time (or period) of the planned agricultural measure. In this case, the planning takes place not directly based on the digital image, but based on data that correspond to a digital image at the time of prediction.

In particular, the growth stage of the cultivated crop plants can change rapidly. If the growth stage of the cultivated crop plants is of decisive importance for an appropriate agricultural measure, e.g. because the measure involves application of an agent in an amount that depends on the leaf area or the amount of biomass present, one can for example use a plant growth model to predict the growth stage for the time of the planned agricultural measure based on the earlier digital image of the field.

The term "plant growth model" is understood to refer to a mathematical model that describes the growth of a plant depending on intrinsic (genetic) and extrinsic (environmental) factors.

Plant growth models exist for multiple crop plants. The term "provision of a plant growth model" is to be understood as meaning both that an existing model is used and that an existing model is adapted or modified, and also that a new model is drawn up.

An introduction to the preparation of plant growth models can be found for example in the books i) "*Mathematische Modellbildung and Simulation* [Mathematical Modelling and Simulation]" by Marco Günther and Kai Velten, published by Wiley-VCH Verlag in October 2014 (ISBN: 978-3-527-41217-4), and ii) "*Working with Dynamic Crop Models*" by Daniel Wallach, David Makowski, James W. Jones and Francois Brun., published in 2014 by Academic Press (Elsevier), USA.

The plant growth model ordinarily simulates the growth of a population of crop plants over a defined period of time. It is also conceivable to use a model based on an individual plant that simulates the energy and material flows in the individual organs of the plant. Mixed models are also usable.

In addition to the genetic features of the plant, the growth of a crop plant is primarily determined by the local weather prevailing during the lifetime of the plant (quantity and spectral distribution of incident solar radiation, temperature gradient, amounts of precipitation, wind), the state of the soil, and the nutrient supply.

The cultivation measures carried out in the past and any infestation with harmful organisms can also affect plant growth and can be taken into account in the growth model.

The plant growth models are as a rule so-called dynamic process-based models (cf. "*Working with Dynamic Crop Models*" by Daniel Wallach, David Makowski, James W. Jones and Francois Brun., published 2014 by Academic Press (Elsevier), USA), but can also be entirely or partially rule-based or statistical or data-supported/empirical. The models are as a rule so-called point models. Here, the models are ordinarily calibrated such that the output reflects the spatial representation of the input. If the input is collected at a point in space or if interpolation or estimation is carried out for a point in space, it is generally assumed that the model output is valid for the entire adjacent field. An application of so-called point models calibrated at field level to further scales, which as a rule are cruder, is known (cf. for example H. Hoffmann et al.: *Impact of spatial soil and climate input data aggregation on regional yield simulations*, 2016, PLoS ONE 11(4): e0151782.doi:10.1371/journal.pone.0151782). Here, application of these so-called point models to multiple points within a field allows partial-area-specific modeling. However, spatial dependencies are neglected in this case, e.g. in the ground water balance. On the other hand, there are also systems for temporally/spatially explicit modeling. These take into account spatial dependencies.

Examples of dynamic, process-based plant growth models are Apsim, Lintul, Epic, Hermes, Monica, STICS, etc.

The following parameters are preferably included in the modeling (input):
   a) weather: daily precipitation sums, solar radiation sums, daily minimum and maximum air temperature, temperature near the ground, soil temperature, wind speed, etc.
   b) soil: soil type, soil texture, soil texture, kind of soil, field capacity, permanent wilting point, organic carbon, mineral nitrogen content, bulk density, van Genuchten parameters, etc.
   c) crop plant: type, species, species-specific parameters such as e.g. specific leaf area index, temperature sums, maximum root depth, etc.
   d) cultivation measures: seeds, sowing date, sowing density, sowing depth, fertilizer, fertilizer amount, number of fertilization dates, fertilization date, soil cultivation, crop residues, crop rotation, distance from field of same crop in the previous year, watering, etc.

In the following, the invention is described in further detail by means of examples and figures, but with no intention of reducing the invention to the features or combinations of features mentioned in the examples.

FIGS. 1 and 2 serve to clarify the present invention.

FIG. 1 is a schematic image of a field for crop plants. The large square with the checkerboard pattern represents the field. The checkerboard pattern illustrates the spatial resolution of the image. It is largely determined by the resolution of the remote sensor used.

An application device in the form of a tractor is shown in the upper left corner of the field. The tractor is equipped with a field sensor (no field sensor is shown in the figure). The field sensor has a higher resolution than the remote sensor used for producing the image (recognizable by the "smaller" checkerboard pattern). However, the range of the field sensor is limited to the environment of the application device. By combining the information from the remote sensor and the field sensor, an agricultural measure can be planned and carried out in a partial-area-specific manner.

However, FIG. 1 is not to be understood as indicating that the remote sensor and field sensor detect the same parameter, only with a different resolution. As already mentioned in several locations of the present text, the remote sensor and field sensor can detect different parameters respectively; for example, a remote sensor can use a first parameter to recognize the requirement for treatment of the field with a plant protection agent, while the field sensor can use a second parameter to determine the local currently required amounts. The remote sensor covers the entire field, while the field sensor covers only a local area.

FIG. 2 is a schematic image of field for crop plants at different points in time t=0 and t<0 for two scenarios a) and b).

Scenario a) relates to the case in which a satellite image of the field is available for a current point in time (t=0). As explained for FIG. 1, the image, which originates from the satellite, shows a lower spatial resolution (black and white checkerboard pattern in the large square) than an area (upper left corner) that is covered by a field sensor (not shown) attached to a tractor. As information on the state of the field is available for the current time (t=0), this information can be linked according to the invention, and an agricultural measure can thus be planned and carried out in a partial-area-specific manner.

It should be noted that the time point t=0 is not really a point in the mathematical sense. Rather, this refers to a period that begins before the period in which the agricultural measure is carried out. The "period t=0" can completely or partially comprise the period of the agricultural measure. What is decisive is that within this "period t=0," the parameters detected by the remote sensor must not change to a significant extent. It is conceivable that the data provided by the remote sensor are produced one week or several days or one day and several hours or one hour before the beginning of the agricultural measure.

Scenario b) relates to the case in which for a current point in time (t=0), no satellite image is available for the field. In order to allow an agricultural measure according to the invention to be planned and carried out despite this, a satellite image produced at an earlier point in time (t<0) is used. Between the time points t<0 and t=0, so much time has elapsed that the field has changed. The parameters detected by the remote sensor at time point t<0 show clear differences from the parameters detected at time point t=0. By means of a prediction models (e.g. a plant growth model), the state of the field at time point t=0 is calculated from the state of the field at time point t<0 so that the information required for planning an agricultural measure is present in the spatial resolution of the earlier satellite image (represented by a grey checkerboard pattern).

In a preferred embodiment of the present invention, an infestation with harmful organisms has been observed in the field for crop plants. In order to prevent the harmful organisms from spreading, the entire field is to be treated with a plant protection agent for controlling the harmful organisms. The amounts of plant protection agents to be applied are to be adapted to the respective sizes of the leaf area of the crop plants.

By means of a first computer system, a digital image of the field is received by a corresponding vendor. The digital image is a satellite image based on which a leaf area index is calculated for each pixel of the satellite image.

A plant protection agent is selected that is known to effectively control the harmful organisms.

The calculated leaf area indices are used to calculate the respective optimum amount of the plant protection agent for each pixel of the digital image. For this purpose, specifications of the manufacturer that provide information on the amount of plant protection agent to be applied per unit leaf area present can be used. The required amounts calculated for the individual pixels constitute an application map.

In addition, the total required amount of plant protection agents is detected in order to supply this amount in a following step.

A period is planned in which the plant protection agent is to be applied. Weather data and weather forecast data are used to identify a period that is in the near future (in order to prevent further spreading of the harmful organisms and thus damage to the crop plants), but in which no precipitation is expected and which is followed by a period of at least one day in which also no precipitation is expected, so that the plant protection agent can exert its action without first being washed away.

When the period for the planned agricultural measure has been reached, a mobile application device carrying the plant protection agent is sent on the way through the field. The application device is equipped with a field sensor that covers the immediate environment in front of the application device (in the direction of movement) in order to determine the local leaf size. The respective amounts of the plant protection agent dispensed are adapted to the locally detected leaf size.

In a further preferred embodiment, the crop plants cultivated in a field are to be supplied with nutrients. Only those crop plants are to be supplied that have reached or exceeded a specified growth threshold. It is not worthwhile to supply nutrients to crop plants whose growth stage is below the threshold value.

A digital image is received in the form of a satellite image, and a vegetation index for each individual pixel is calculated based thereon.

The vegetation indices are used to determine for each pixel whether the growth threshold has been reached, exceeded, or not reached.

The amount of nutrients required to supply the plants that have reached or exceeded the growth threshold is calculated.

Using the distribution of the plants to be supplied, the shortest route required by an application device to apply nutrients, and optionally to provide a resupply in the interim, is calculated.

The required amount of nutrients is provided and loaded into an application device that is equipped with a field sensor. While the application device moves through the field, the field sensor detects a local vegetation index in order to locally determine which crop plants have reached or exceeded a growth threshold. The identified crop plants are supplied with nutrients. Those crop plants that have not exceeded the growth threshold are not supplied with nutrients.

Combinations of the aforementioned embodiments and further embodiments are conceivable.

The invention claimed is:

1. A method comprising:
receiving at least one digital image of a field for cultivated crop plants, wherein the at least one digital image has been generated by one or a plurality of remote sensors;
planning a partial-area-specific agricultural measure in the field based on the digital image of the field and providing partial-area-specific implementation of the measure, wherein planning the partial-area-specific agricultural measure comprises:
- determining, based on the digital image and a plant growth model, a requirement of at least a portion of the field and the cultivated crop plants for a plurality of agricultural measures selected from the following list: cultivating the soil, application of seeds, treatment with one or a plurality of plant protection agents, and watering, wherein the plant growth model simulates the growth of the cultivated crop plants over a defined period of time, and wherein the plant growth model is used to predict a state of the field from the digital image for a time period during which the agricultural measure is to be carried out; and
- carrying out the measure, wherein during the implementation of the measure by one or a plurality of sensors, one or a plurality of current local parameters is/are recorded over the field, and implementation of the measure is continuously adapted to the current local parameter(s).

2. The method according to claim 1, wherein planning of the partial-area-specific agricultural measure further comprises the following steps:
- determining the total amount required to meet the determined requirement, wherein the total amount is determined based on the at least one digital image, and
- providing implementation of the agricultural measure based on the total amount determined.

3. The method according to claim 2, wherein planning of the partial-area-specific agricultural measure further comprises the following step:
- determining the partial-area-specific amounts required to meet the determined requirement.

4. The method according to claim 2, wherein planning of the partial-area-specific agricultural measure further comprises the following step:
- specifying the route of one or a plurality of apparatuses through or over the field for implementing the agricultural measure based on the total amount determined and/or the partial-area-specific required amounts.

5. The method according to claim 1, wherein the digital image is a satellite image.

6. The method according to claim 2, wherein a pest infestation has been detected or a pest infestation is imminent in the field and there is therefore a requirement for treatment with a plant protection agent.

7. The method according to claim 2, wherein a nutrient deficit has been detected or a nutrient deficit has been predicted in the field, and there is therefore a requirement for treatment with one or a plurality of nutrients.

8. The method according to claim 2, wherein there is a requirement for spreading seeds in the field.

9. The method according to claim 3, wherein the partial-area-specific required amount depends on the amount of biomass present in the field, which is derived based on a vegetation index from the at least one digital image.

10. The method according to claim 3, wherein the partial-area-specific required amount depends on the size of the leaf areas present, which is derived from a leaf area index from the at least one digital image.

11. The method according to claim 3, wherein based on the partial-area-specific required amounts, a digital application map is prepared, which is updated and/or refined using the local parameters in implementing the agricultural measure.

12. The method according to claim 1, wherein the predicted state is used to plan the agricultural measure.

13. A system comprising:
- a first computer system, configured such that:
  - the first computer system receives at least one digital image of a field for crop plants, wherein the at least one digital image has been generated using one or a plurality of remote sensors; and
  - the first computer system supports a user, based on the digital image of the field, in planning a partial-area-specific agricultural measure in the field, wherein the computer system determines means that must be provided for the partial-area-specific implementation of the measure, and wherein the computer system determines, based on the digital image and a plant growth model, a requirement of at least a portion of the field and the cultivated crop plants for a plurality of agricultural measures selected from the following list: cultivating the soil, application of seeds, treatment with one or a plurality of plant protection agents, and watering, wherein the plant growth model simulates the growth of the cultivated crop plants over a defined period of time, and wherein the plant growth model is used to predict a state of the cultivated crop plants from the digital image for a time period during which the agricultural measure is to be carried out; and
- a second computer system, configured such that:
- the second computer system determines the current local state of the field in implementation of the measure by means of one or a plurality of sensors during the implementation of the measure and adapts implementation of the measure to the current local state.

14. The system according to claim 13, further comprising at least one application device, which is configured such that it moves through and/or over the field while applying the current local required amounts, and/or at least one sensor for detecting locale conditions in the field.

15. The system according to claim 14, wherein the second computer system is the at least one application device and/or the at least one sensor moves in and/or over the field together with the at least one application device.

* * * * *